O. LUNDIN.
Wheels for Vehicles.

No. 151,301. Patented May 26, 1874.

WITNESSES:

INVENTOR:

BY

ATTORNEYS.

UNITED STATES PATENT OFFICE.

OLIVER LUNDIN, OF RICHLAND, IOWA.

IMPROVEMENT IN WHEELS FOR VEHICLES.

Specification forming part of Letters Patent No. 151,301, dated May 26, 1874; application filed February 7, 1874.

*To all whom it may concern:*

Figure 1:
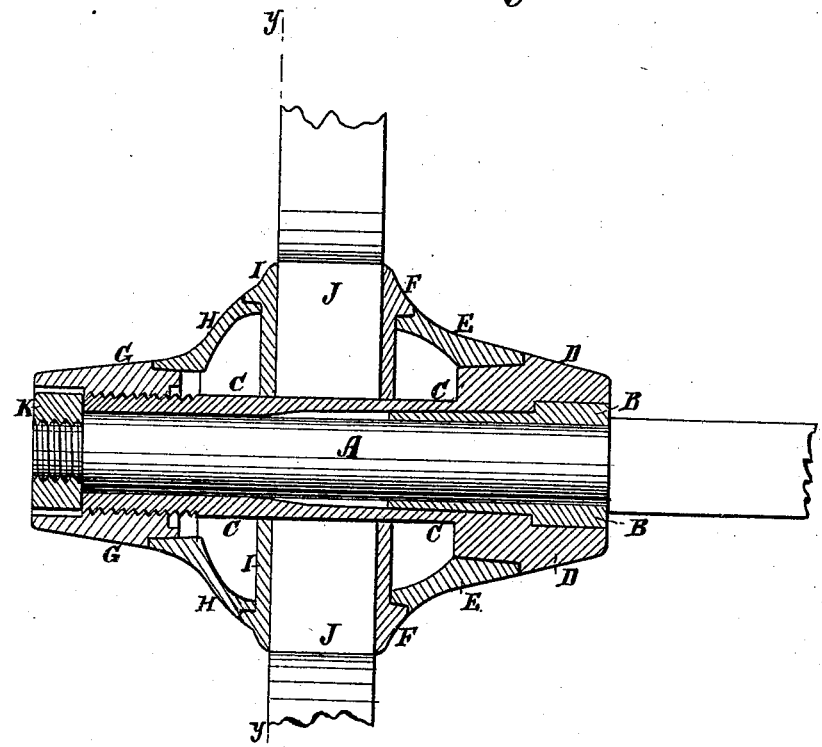
Figure 2:
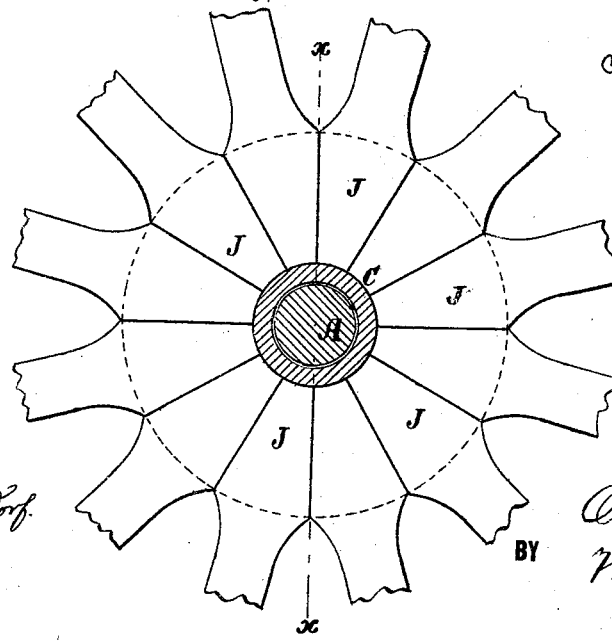

Be it known that I, OLIVER LUNDIN, of Richland, in the county of Keokuk and State of Iowa, have invented a new and useful Improvement in Wheels and Axles for Vehicles, of which the following is a specification:

Figure 1 is a section of a hub, taken through the line $x\,x$, Fig. 2, and shown as applied to an axle-arm. Fig. 2 is a section of the same, taken through the line $y\,y$, Fig. 1.

Similar letters of reference indicate corresponding parts.

The invention will first be fully described, and then pointed out in the claim.

A represents the axle-arm, about the construction of which there is nothing new. B is a thimble, which fits snugly upon the inner part of the axle-arm A, so that it will not turn with the wheel, and which, when worn flat upon its lower side, can be driven off and turned, so that the wear may again come upon a cylindrical surface. The thimble B fits into the inner part of the axle-box C, and has a shoulder formed upon it, which fits into a countersink or rabbet formed in said axle-box, as shown in Fig. 1. The inner end of the box C has a collar or shoulder, D, formed upon or securely attached to its inner end. The collar or shoulder D is rabbeted to receive the conical ring or cup E, the other edge of which is rabbeted to fit into a circular flange formed upon the outer side of the disk F. Upon the outer end of the box C is cut a screw-thread, into which fits the screw-thread cut in the inner surface of the inner part of the nut G, the outer part of which projects to serve as a band to cover the nut screwed upon the end of the axle-arm A. The inner end of the nut G is rabbeted to receive the outer edge of the conical or cup band H, the other edge of which is rabbeted to fit into the circular flange formed upon the outer side of the disk I. The two cups E H and the two disks F I are similar to each other. The inner ends of the spokes J rest upon the box C between the two disks F I, and are made wedge-shaped, so as to rest against and mutually support each other, as shown in Fig. 2.

By this construction, by screwing up the band-nut G the disks I F will be pressed against the ends of the spokes J, securely clamping them in place. This construction allows any of the spokes to be removed and replaced by new ones without taking off the tire.

The wheel is secured upon the axle-arm by a nut, K, screwed upon the end of said axle-arm, and which rests against the end of the box C, as shown in Fig. 1.

Having thus described my invention, I claim as new and desire to secure by Letters Patent—

The combination of thimble B, journal-box C D, nut G, the cups E H, and disks F I, all as and for the purpose specified.

OLIVER LUNDIN.

Witnesses:
JOHN CARMICHAEL,
J. S. HAWORTH.